US008731534B2

(12) United States Patent
Kim et al.

(10) Patent No.: US 8,731,534 B2
(45) Date of Patent: May 20, 2014

(54) MOBILE TERMINAL AND METHOD FOR DISPLAYING IMAGE ACCORDING TO CALL THEREIN

(75) Inventors: Jung Hun Kim, Busan (KR); Young June Woo, Hwaseong-si (KR); Jae Hwan Kim, Suwon-si (KR); Sin Jae Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 963 days.

(21) Appl. No.: 12/057,739

(22) Filed: Mar. 28, 2008

(65) Prior Publication Data

US 2008/0254783 A1 Oct. 16, 2008

(30) Foreign Application Priority Data

Apr. 13, 2007 (KR) .................. 10-2007-0036238

(51) Int. Cl.
*H04M 3/00* (2006.01)
(52) U.S. Cl.
USPC .......................................... 455/418; 370/338
(58) Field of Classification Search
CPC .. H04N 7/14; H04N 5/23219; H04N 1/00331
USPC .............. 455/415, 550.1, 566, 418; 348/14.01–14.16, 354, 355.02, 355.05; 379/93.23, 93.17, 93.19
See application file for complete search history.

(56) References Cited

U.S. PATENT DOCUMENTS

| | | | | |
|---|---|---|---|---|
| 5,684,891 | A * | 11/1997 | Tanaka et al. ................. | 382/178 |
| 6,751,399 | B1 * | 6/2004 | Okabayashi et al. ......... | 386/225 |
| 7,502,450 | B2 * | 3/2009 | Sakai et al. ................. | 379/93.35 |
| 7,565,139 | B2 * | 7/2009 | Neven et al. ................. | 455/414.3 |
| 7,751,807 | B2 * | 7/2010 | Lin et al. ........................ | 455/418 |
| 2002/0094806 | A1 * | 7/2002 | Kamimura ..................... | 455/415 |
| 2003/0022659 | A1 * | 1/2003 | Mun et al. ..................... | 455/415 |
| 2003/0153337 | A1 | 8/2003 | Ito | |
| 2003/0185423 | A1 * | 10/2003 | Dobashi ........................ | 382/118 |
| 2004/0008873 | A1 * | 1/2004 | Sogo et al. .................... | 382/118 |
| 2004/0207722 | A1 | 10/2004 | Koyama et al. | |
| 2004/0233221 | A1 | 11/2004 | Taniguchi et al. | |
| 2005/0276483 | A1 * | 12/2005 | Miyake ........................ | 382/209 |
| 2006/0061810 | A1 | 3/2006 | Choi et al. | |
| 2006/0240862 | A1 * | 10/2006 | Neven et al. ................. | 455/550.1 |
| 2007/0054661 | A1 * | 3/2007 | Park et al. .................... | 455/418 |
| 2007/0072648 | A1 | 3/2007 | Stoops | |
| 2007/0127786 | A1 * | 6/2007 | Hiraizumi et al. ............ | 382/118 |

(Continued)

FOREIGN PATENT DOCUMENTS

| | | |
|---|---|---|
| EP | 1 351 197 | 10/2003 |
| JP | 2000-253111 | 9/2000 |

(Continued)

*Primary Examiner* — Marcos Batista
(74) *Attorney, Agent, or Firm* — The Farrell Law Firm, P.C.

(57) ABSTRACT

A mobile terminal and a method for displaying an image in the mobile terminal. The method includes registering a counterparty's image in a counterparty's phone number information, extracting an image containing the counterparty's image based on the registered image, and displaying the registered image and the extracted image. At least one image from the registered image and the extracted image may be selected and displayed, wherein the at least one selected image may be displayed by sequentially changing the displayed image according to a rule. The mobile terminal and the method enable the mobile terminal to display various images associated with a counterparty, thus providing user satisfaction and eliminating an inconvenience of requiring the user to change an image.

16 Claims, 5 Drawing Sheets

(56) References Cited

U.S. PATENT DOCUMENTS

| | | | |
|---|---|---|---|
| 2007/0189584 A1* | 8/2007 | Li | 382/118 |
| 2008/0112621 A1* | 5/2008 | Gallagher et al. | 382/190 |
| 2008/0158385 A1* | 7/2008 | Lee et al. | 348/231.3 |
| 2008/0215884 A1 | 9/2008 | Yonemoto | |
| 2008/0243861 A1* | 10/2008 | Wassingbo et al. | 707/10 |
| 2008/0279481 A1* | 11/2008 | Ando | 382/306 |

FOREIGN PATENT DOCUMENTS

| | | |
|---|---|---|
| JP | 2004-336711 | 11/2004 |
| JP | 2006-086895 | 3/2006 |
| JP | 2007-312262 | 11/2007 |
| KR | 1020030043856 | 6/2003 |
| KR | 1020040046734 | 6/2004 |
| KR | 1020060027475 | 3/2006 |

* cited by examiner

MOBILE TERMINAL AND METHOD FOR DISPLAYING IMAGE ACCORDING TO CALL THEREIN

PRIORITY

This application claims priority under 35 U.S.C. §119(a) to an application entitled "MOBILE TERMINAL AND METHOD FOR DISPLAYING IMAGE ACCORDING TO CALL THEREIN" filed in the Korean Intellectual Property Office on Apr. 13, 2007 and assigned Serial No. 2007-0036238, the contents of which are incorporated herein by reference.

BACKGROUND OF THE INVENTION

1. Field of the Invention

The present invention relates generally to a mobile terminal and a method for displaying an image in the mobile terminal, and in particular, to a mobile terminal capable of displaying an image of a counterparty associated with a call being transmitted and received and to a method for displaying an image according to a call in the mobile terminal.

2. Description of the Related Art

Mobile communication technologies enable a user of a mobile communication terminal to place and receive voice calls with little limitation of time and location. As mobile communication terminals have evolved to incorporate diverse functions, such as delivering text information and video information, an MP3 player, and games, a user can interface the functions with a screen of the mobile communication terminal.

A display of a mobile terminal can display an image of a counterparty associated with a call being transmitted and received. That is, if a call is placed to or received from a counterparty whose image is registered in a phone book, the registered image of the counterparty is displayed on the display. Displaying the image of the counterparty enables a user of the mobile terminal to intuitively identify the counterparty.

However, conventional mobile terminals allow display of only one image of a counterparty registered in a phone book, giving a monotonous feeling to users. This problem can be overcome by changing images of the counterparty registered in the phone book. However, changing the images often may be inconvenient or complicated for users.

SUMMARY OF THE INVENTION

In order to solve the above problems, the present invention provides a mobile terminal and a method for displaying an image according to a call in the mobile terminal that enable display of various images associated with a counterparty during a call, thus providing user satisfaction and eliminating an inconvenience of the user changing images.

In accordance with an embodiment of the present invention, a method is provided for displaying an image according to a call in a mobile terminal. The method includes registering a counterparty's image in a counterparty's phone number information; extracting an image containing the counterparty's image based on the registered image when a call is generated through a counterparty's phone number; and displaying the registered image and the extracted image.

Extracting an image may include extracting an image containing the counterparty's face from images stored in the mobile terminal. Further, extracting an image may include extracting an image containing the counterparty's face from images stored in at least one of a user's web server and a counterparty's web server.

Displaying the registered image and the extracted image may include selecting at least one image from the registered image and the extracted image, and displaying the at least one selected image. The at least one selected image may be displayed by sequentially changing the displayed image according to a preset rule.

In accordance with another embodiment of the present invention, a mobile terminal is provided, including a display unit for displaying an image; an image registration unit for registering a counterparty's image in a counterparty's phone number information, an image extraction unit for extracting an image containing the counterparty's image based on the registered image when a call is generated through a counterparty's phone number; and an image control unit for controlling the display unit to display the registered image and the extracted image.

The mobile terminal may further include a storage unit that stores a plurality of images. The image extraction unit may extract an image containing a counterparty's face from the images stored in the storage unit.

Further, the image extraction unit may extract an image containing a counterparty's face from images stored in at least one of a user's web server and the counterparty's web server.

The image control unit selects at least one image from the registered image and the extracted image and controls the display unit to display the at least one selected image. The image control unit may control the display unit to display the at least one selected image by sequentially changing the displayed image according to a preset rule.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF PREFERRED EMBODIMENTS

Hereinafter, preferred embodiments of the present invention are described in detail with reference to the accompanying drawings. The same reference numbers are used throughout the drawings. Detailed descriptions of constructions or processes well-known in the art are omitted to avoid obscuring the subject matter of the present invention.

Figure 1:
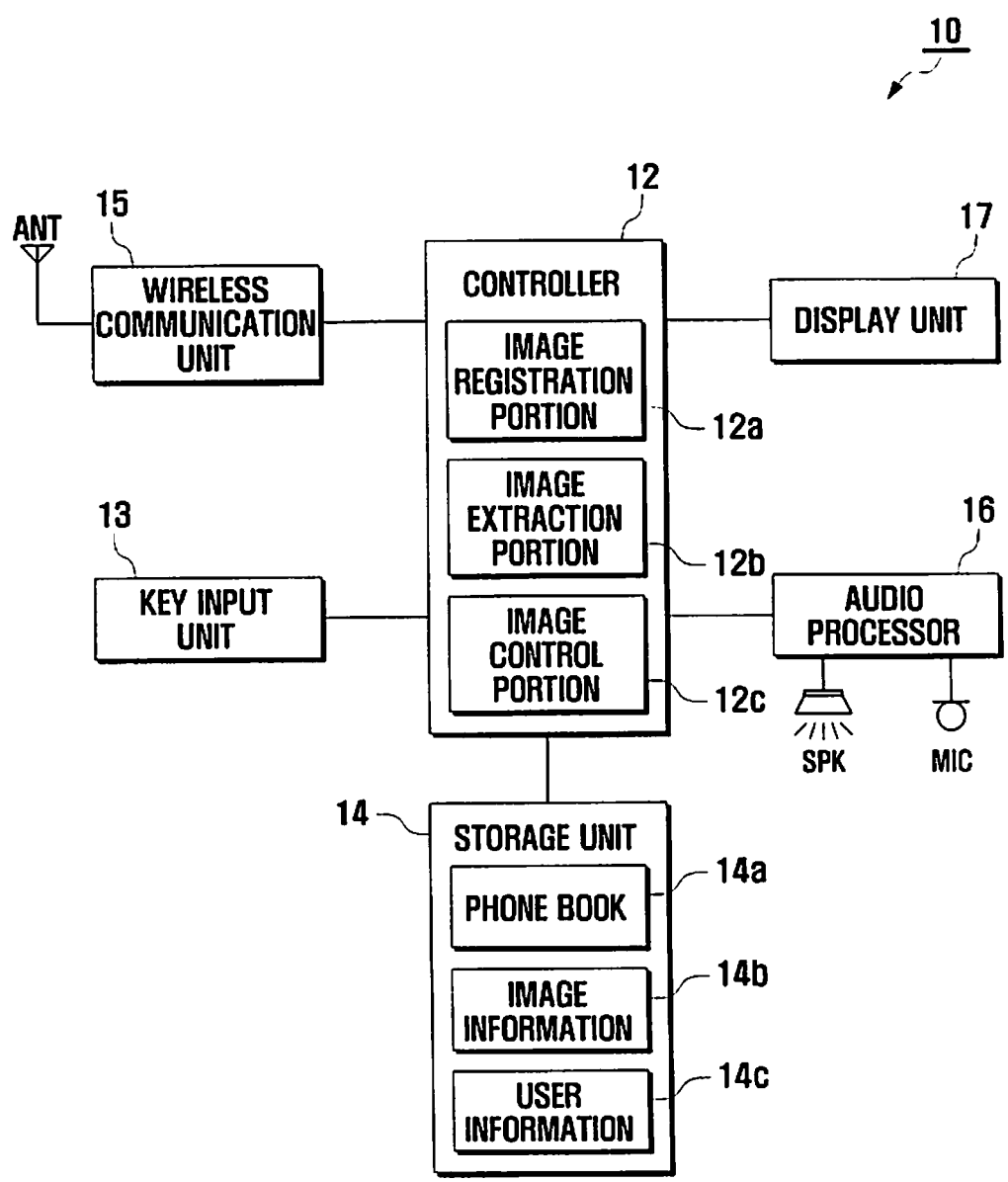
FIG. 1 is a block diagram illustrating a configuration of a mobile terminal capable of performing a function of displaying an image according to an embodiment of the present invention.

FIG. 1 is a block diagram illustrating a configuration of a mobile terminal 10 capable of performing a function of displaying an image according to a call according to an embodiment of the present invention.

Referring to FIG. 1, the mobile terminal 10 according to the present embodiment is capable of displaying a counterparty's image when a call is made. Mobile terminal 10 includes a controller 12, a key input unit 13, a storage unit 14, a wireless communication unit 15, an audio processor 16, and a display unit 17. In this case, the call can be made to or received from the counterparty.

The controller 12 performs the overall control operation of the mobile terminal 10. The controller 12 controls an operation of displaying an image according to a call generated.

The key input unit 13 has a plurality of keys for manipulating the operation of the mobile terminal 10. The key input unit 13 generates key data according to user selection of keys and outputs the key data to the controller 12.

The storage unit 14 stores programs necessary for controlling the operation of the mobile terminal 10 and data generated while executing the programs. Particularly, the storage unit 14 stores an execution program for displaying an image according to a call generated, and further stores a phone book 14a, image information 14b, and user information 14c. More specifically, the phone book 14a includes phone number information for registered counterparties. The phone number information contains the name of each counterparty, phone number and e-mail address, and a Uniform Resource Locator (URL) address for a web server in which the counterparty's images are stored. The image information 14b contains images directly taken through a camera module (not shown), images downloaded from external servers, and at least one image of each counterparty registered in the phone book 14a. The user information 14c contains a user's phone number and an e-mail address, and a URL address for a web server in which the user's images are stored.

The wireless communication unit 15 performs communications with a mobile terminal of a counterparty, such as transmitting and receiving voice signals or text messages. The wireless communication unit 15 modulates and frequency-converts information output from the controller 12 and transmits a wireless signal through an antenna ANT. The wireless communication unit 15 also separates a reception signal from the signal received via the antenna ANT, frequency-converts and demodulates the reception signal, and outputs the result to the controller 12.

The audio processor 16 is controlled by the controller 12 to digitize an audio signal input via a microphone MIC, and to demodulate audio data received through the wireless communication unit 15 and output the result via a speaker SPK.

The display unit 17 displays information stored in the storage unit 14 including various function menus being executed on the mobile terminal 10. In the present embodiment, the display unit 17 displays a counterparty's registered images when a call is made. In this case, the display unit 17 may be a Liquid Crystal Display (LCD), and may include a touch screen. The touch screen serves both as a display and as an input device.

To control a function of displaying an image according to a call, the controller 12 includes an image registration portion 12a, an image extraction portion 12b, and an image control portion 12c.

The image registration portion 12a registers a counterparty's image with the counterparty's phone number information. Preferably, the counterparty's registered image contains the counterparty's face. Images stored in the storage unit 14 or the counterparty's images stored in a user's web server or in a counterparty's web server, may be used for registering the counterparty's image.

When a call is generated between the user of the mobile terminal 10 and a counterparty having a registered image, the image extraction portion 12b extracts an image containing the counterparty's image based on the counterparty's registered image. In this case, the image extraction portion 12b extracts an image containing the counterparty's face from images stored in the storage unit 14 or in a user's or counterparty's web server.

More specifically, the image extraction portion 12b recognizes the counterparty's face from a registered image and extracts an image containing the recognized counterparty's face among images stored in the storage unit 14 or images stored in a user's or counterparty's web server. For example, the image extraction portion 12b may extract an image containing the counterparty's face from images located at a URL address for a web server contained in the user information 14c or in the phone number information of the counterparty. Various methods such as an eigenface method based on Principle Component Analysis (PCA), a fisherface method using Fisher Linear Discriminant (FLD), and a combination of PCA and Support Vector Machine (SVM) methods may be used for face recognition.

The image control portion 12c controls the display unit 17 to display various images using at least one of a registered image and an extracted image. For example, the image control portion 12c can select at least one of the registered image and extracted image and control the display unit 17 to display the at least one selected image. Alternatively, the image control portion 12c may control the display unit 17 to display a plurality of registered and extracted images in such a way as to sequentially change the images according to a preset rule. The images may be displayed in the order of date at which an image is generated or modified, or in a random order. If a plurality of images is displayed in a sequential manner, the image control portion 12c controls the display unit 17 to display the images in a slide show.

Thus, the mobile terminal 10 extracts various images containing a counterparty's image based on a counterparty's registered image and controls the display unit 17 to display the extracted images when a call is generated.

The mobile terminal 10 according to the present embodiment is capable of transmitting and receiving calls to and from a counterparty's phone. Examples of the mobile terminal 10 are a Personal Digital Assistant (PDA), Smart Phone, International Mobile Telecommunication 2000 (IMT-2000) terminal, Wideband Code Division Multiple Access (WCDMA) terminal, and Universal Mobile Telecommunication Service (UMTS) terminal.

Although not shown, the mobile terminal 10 may further include any of a camera module, Bluetooth® (hereinafter, "Bluetooth") module, digital broadcasting receiver, and Global Positioning System (GPS) receiver.

Figure 2:
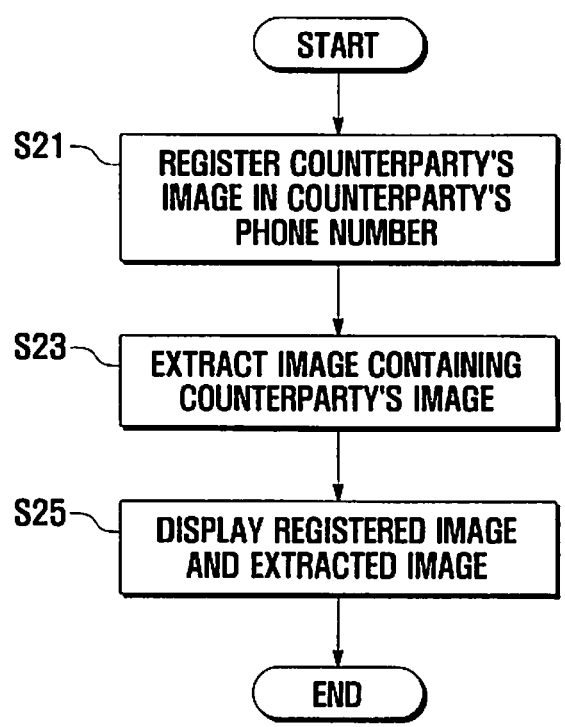
FIG. 2 is a flowchart illustrating a method for displaying an image in a mobile terminal according to an embodiment of the present invention.

FIG. 2 is a flowchart illustrating a method for displaying an image in the mobile terminal 10 according to an embodiment of the present invention. Referring to FIGS. 1 and 2, a counterparty's image is registered in the counterparty's phone number information contained in a phone book 14a in step S21. When a call is generated between the user of the mobile terminal 10 and the counterparty having the registered image, an image containing the counterparty's image based on the counterparty's registered image is extracted in step S23, and the registered image and the extracted image are displayed in step S25.

Figure 3:
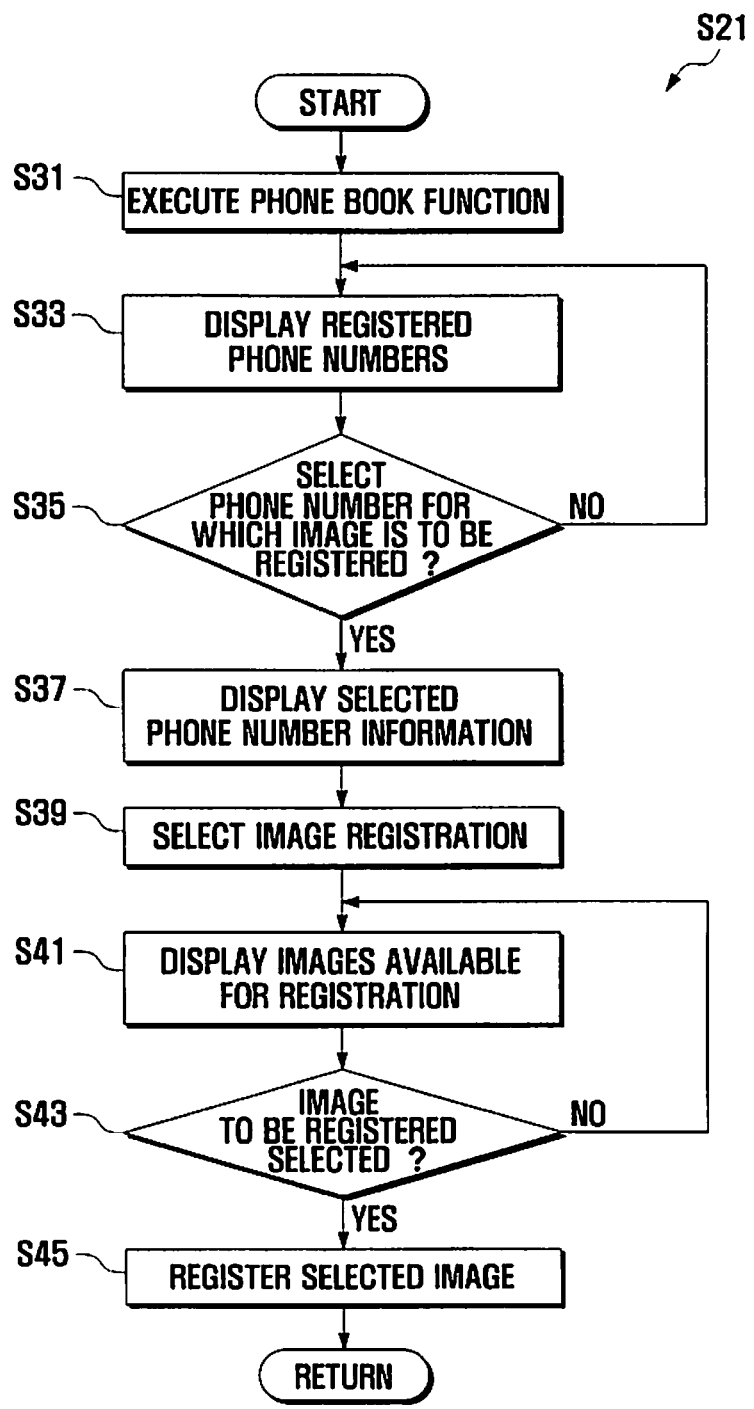
FIG. 3 is a flowchart illustrating an operation of registering an image according to the method of FIG. 2.

FIG. 3 is a flowchart illustrating step S21 of registering an image according to the method of FIG. 2.

Referring to FIGS. 1 and 3, upon executing a function of the is phone book 14a according to a user's key input in step S31, the controller 12 controls the display unit 17 to display registered counterparty phone numbers in step S33. Counterparty phone numbers may be displayed in a list or in a alphabetical order. The counterparty phone numbers can be classified and displayed by group or as an icon using each counterparty's registered image.

Thereafter, the controller 12 determines whether a specific phone number with which an image is to be registered is selected among the displayed phone numbers in step S35. If a phone number is not selected, the controller 12 returns to step S33 and maintains the state in which the phone numbers are displayed.

If a specific phone number is selected at step S35, the controller 12 controls the display unit 17 to display information associated with the selected phone number in step S37. The phone number information includes the corresponding counterparty's name, a phone number, and an e-mail address. The user is able to register, modify and delete information by selecting keys on a screen where the phone number information is displayed.

Image registration is selected in the phone number information through a user's key input in step S39, and the image registration portion 12a controls the display unit 17 to display images available for registration in step S41. The images include the counterparty's images stored in a user's and a counterparty's web server. The image registration portion 12a can classify images according to the location at which the images are stored for display.

The image registration portion 12a determines whether an image to be registered is selected among the displayed images through the user's key input in step S43. If an image to be registered is not selected, the image registration portion 12a maintains the state in which the images available for registration are displayed at step S41.

If an image to be registered is selected at step S43, the image registration portion 12a registers the selected image in the counterparty's phone number information in step S45.

Figure 4:
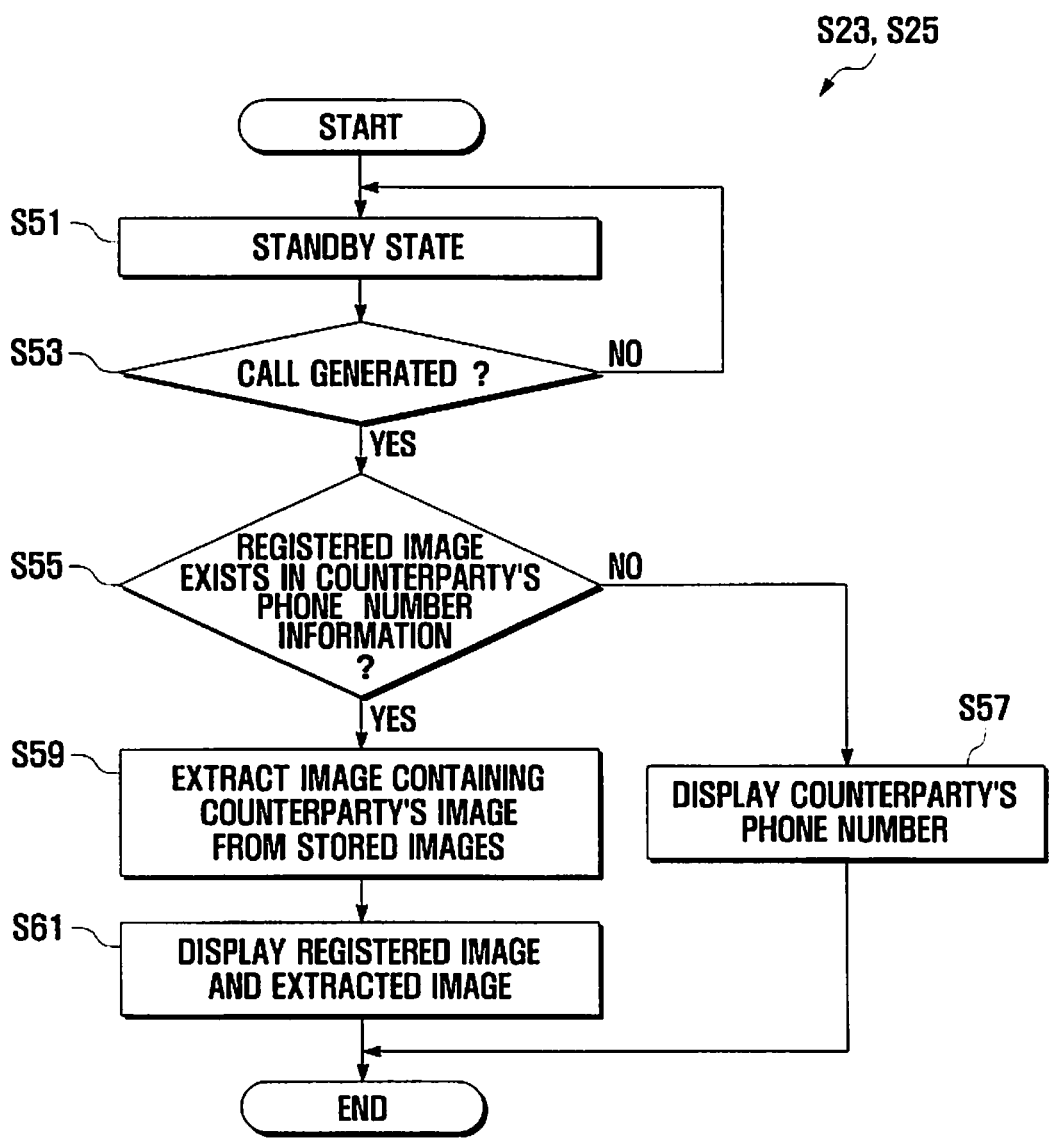
FIG. 4 is a flowchart illustrating operations of extracting and displaying an image according to the method of FIG. 2.

FIG. 4 is a flowchart illustrating step S23 of extracting an image and step S25 of displaying an image according to the method of FIG. 2.

While the mobile terminal 10 is in a standby state in step S51, the controller 12 determines whether a call is generated in step S53. If a call is not generated, the controller 12 maintains the standby state.

When a call is generated, the image control portion 12c determines whether a registered image exists in the counterparty's phone number information in step S55. When a registered image does not exist, the image control portion 12c controls the display unit 17 to display the counterparty's phone number in step S57. The counterparty's name may also be displayed.

If a registered image exists in the counterparty's phone number information at step S55, the image extraction portion 12b extracts an image containing the counterparty's image from images stored in the storage unit 14 in step S59.

The image control portion 12c selects at least one of the registered image and the extracted image and controls the display unit 17 to display the selected image according to a preset rule in step S61. If a plurality of images is selected at step S61, the selected images can be displayed in the order of time at which an image is generated or modified, a random order, or in a slide show format.

In the above description, the image extraction portion 12b extracts the counterparty's image from images stored in the storage unit 14; however, an image containing the counterparty's image can also be extracted from images stored in a user's or a counterparty's web server, as previously described.

Figure 5:
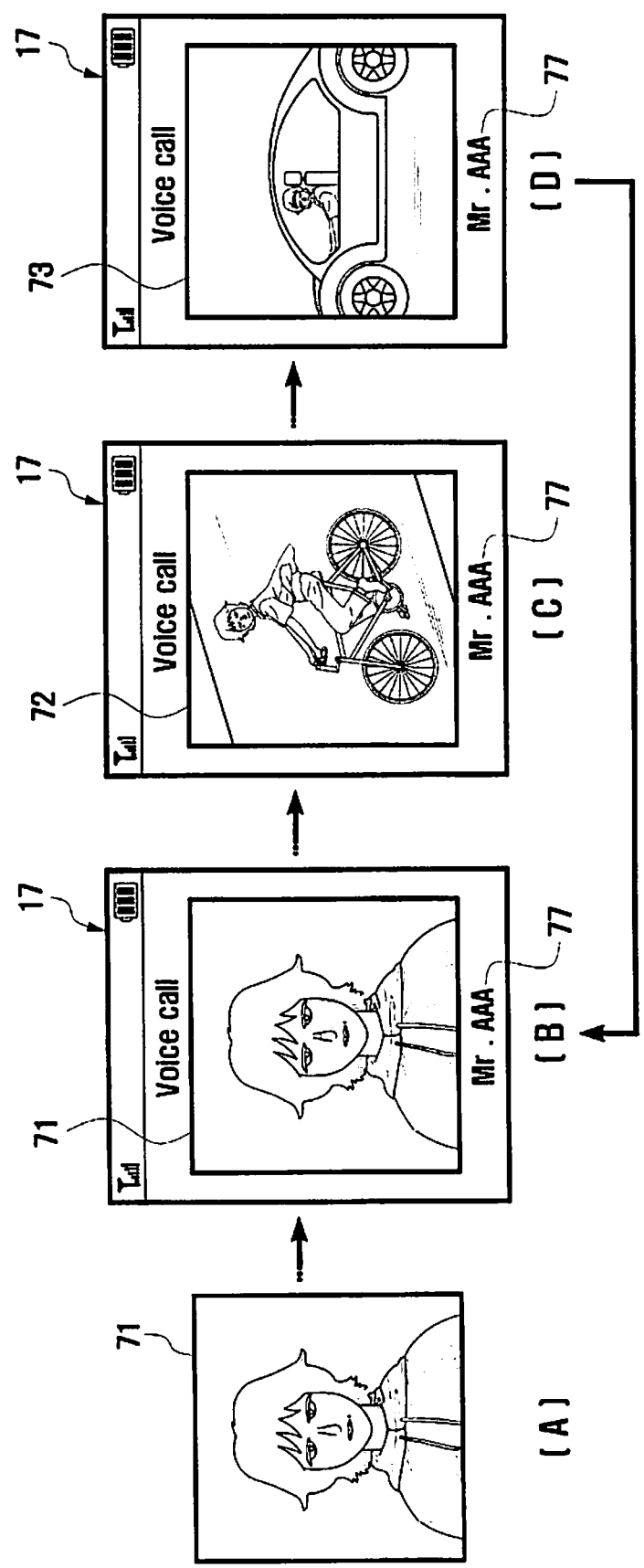
FIG. 5 shows representations of screens illustrating the method of is FIG. 2.

Images displayed on the display unit 17 when a call is generated according to a method for displaying an image of the present invention are described with reference to FIGS. 1 and 5. FIG. 5 shows representations of screens illustrating the method of FIG. 2.

FIG. 5A shows a registered image 71 of a counterparty "Mr. AAA" registered in the phone book 14a in the mobile terminal 10. The registered image 71 contains the counterparty's face.

According to a conventional image display method, when a call is received from a phone having the phone number of the counterparty, "Mr. AAA," registered in the phone book 14a, the image control portion 12c controls the display unit 17 to display only the counterparty's registered image 71, and optionally to display a counterparty's name 77, as illustrated in FIG. 5B.

According to the present invention, the image extraction portion 12b extracts counterparty's images 72 and 73 illustrated in FIGS. 5C and 5D based on the registered image 71. The image control portion 12c then controls the display unit 17 to display the registered image 71 and the extracted images 72 and 73 in a sequential and repetitive manner as illustrated in FIGS. 5B-5D. The counterparty's name 77, "Mr. AAA," may also be displayed below the images 71 through 73, as illustrated in FIGS. 5B-5D.

A method for displaying an image in a mobile terminal according to the present invention enables the mobile terminal to display various images containing a counterparty's image, including a registered image and images extracted based on the registered image, when a call is generated between the user of the mobile terminal and the counterparty having the registered image. The present invention can provide user satisfaction and can eliminate an inconvenience of requiring the user to change an image.

While the invention has been shown and described with reference to a certain preferred embodiments thereof, it will be understood by those skilled in the art that various changes in form and details may be made therein without departing from the spirit and scope of the invention as defined by the appended claims.

What is claimed is:

1. A method for displaying an image according to a call in a mobile terminal, the method comprising:
   registering a counterparty's image in a counterparty's phone number information;
   recognizing the registered counterparty's image, comparing the recognized image with a plurality of images, and extracting at least one image from the plurality of images, which is different from the registered counterparty's image, containing the counterparty's image based on the recognized counterparty's image and the comparison, when a call is generated through a counterparty's phone number; and
   displaying the registered image and the extracted image.

2. The method of claim 1, wherein the registered image contains the counterparty's face.

3. The method of claim 2, wherein extracting an image comprises extracting an image containing the counterparty's face from images stored in the mobile terminal.

4. The method of claim 2, wherein extracting an image comprises extracting an image containing the counterparty's face from images stored in at least one of a user's web server and a counterparty's web server.

5. The method of claim 3, wherein extracting an image comprises extracting an image containing the counterparty's face from images stored in at least one of a user's web server and a counterparty's web server.

6. The method of claim 4, wherein displaying the registered image and the extracted image comprises:
   selecting at least one image from the registered image and the extracted image; and
   displaying the at least one selected image.

7. The method of claim 6, wherein the at least one selected image is displayed by sequentially changing the displayed image according to a preset rule.

8. The method of claim 7, wherein the preset rule is one of an order of date at which an image is generated, an order of date at which an image is modified, and a random order.

9. A mobile terminal comprising:
   a display unit for displaying an image;
   an image registration unit for registering a counterparty's image in a counterparty's phone number information;
   an image extraction unit for recognizing the registered counterparty's image, comparing the recognized image with a plurality of images, and extracting at least one image from the plurality of images, which is different from the registered counterparty's image, containing the counterparty's image based on the recognized counterparty's image and the comparison, when a call is generated through a counterparty's phone number; and
   an image control unit for controlling the display unit to display the registered image and the extracted image.

10. The mobile terminal of claim 9, wherein the registered image contains the counterparty's face.

11. The mobile terminal of claim 10, further comprising a storage unit, the storage unit storing a plurality of images, wherein the image extraction unit extracts an image containing the counterparty's face from the images stored in the storage unit.

12. The mobile terminal of claim 10, wherein the image extraction unit extracts an image containing the counterparty's face from images stored in at least one of a user's web server and a counterparty's web server.

13. The mobile terminal of claim 11, wherein the image extraction unit extracts an image containing the counterparty's face from images stored in at least one of a user's web server and a counterparty's web server.

14. The mobile terminal of claim 12, wherein the image control unit selects at least one image from the registered image and the extracted image and controls the display unit to display the at least one selected image.

15. The mobile terminal of claim 14, wherein the image control unit controls the display unit to display the at least one selected image by sequentially changing the displayed image according to a preset rule.

16. The mobile terminal of claim 15, wherein the preset rule is one of an order of date at which an image is generated, an order of date at which an image is modified, and a random order.

* * * * *